United States Patent
Chung et al.

(10) Patent No.: US 9,349,537 B2
(45) Date of Patent: May 24, 2016

(54) MULTILAYER CERAMIC DEVICE INCLUDING CRACK GUIDE PATTERNS HAVING DIFFERENT STRUCTURES

(71) Applicant: SAMSUNG ELECTRO-MECHANICS CO., LTD., Suwon (KR)

(72) Inventors: Hae Sock Chung, Suwon (KR); Doo Young Kim, Suwon (KR); Na Rim Ha, Suwon (KR); Chang Hoon Kim, Yongin (KR); Sang Hyun Park, Suwon (KR)

(73) Assignee: SAMSUNG ELECTRO-MECHANICS CO., LTD., Gyeonggi-Do (KR)

( * ) Notice: Subject to any disclaimer, the term of this patent is extended or adjusted under 35 U.S.C. 154(b) by 123 days.

(21) Appl. No.: 14/175,112

(22) Filed: Feb. 7, 2014

(65) Prior Publication Data

US 2014/0233150 A1    Aug. 21, 2014

(30) Foreign Application Priority Data

Feb. 18, 2013   (KR) .................. 10-2013-0017016

(51) Int. Cl.
| | |
|---|---|
| *H01G 4/005* | (2006.01) |
| *H01G 4/12* | (2006.01) |
| *H01G 4/30* | (2006.01) |
| *H01G 4/015* | (2006.01) |
| *H01G 4/012* | (2006.01) |

(52) U.S. Cl.
CPC ............ *H01G 4/005* (2013.01); *H01G 4/015* (2013.01); *H01G 4/12* (2013.01); *H01G 4/30* (2013.01); *H01G 4/012* (2013.01)

(58) Field of Classification Search
CPC .......... H01G 4/015; H01G 4/30; H01G 4/12; H01G 4/012
See application file for complete search history.

(56) References Cited

U.S. PATENT DOCUMENTS

| | | | |
|---|---|---|---|
| 2004/0121897 A1 | 6/2004 | Seo et al. | |
| 2010/0002356 A1* | 1/2010 | Yoshida | H01G 4/30 361/301.4 |
| 2010/0271751 A1* | 10/2010 | Sasabayashi | H01G 4/012 361/301.4 |

FOREIGN PATENT DOCUMENTS

| | | |
|---|---|---|
| CN | 1510703 A | 7/2004 |
| JP | 2002-75780 | 3/2002 |

(Continued)

OTHER PUBLICATIONS

Office Action issued Apr. 6, 2016, in related Chinese Application No. 201410053295.9 (English Translation provided).

*Primary Examiner* — David M Sinclair
(74) *Attorney, Agent, or Firm* — McDermott Will & Emery LLP

(57) ABSTRACT

Disclosed herein is a multilayer ceramic device including: a device body having side surfaces spaced apart from each other and circumferential surfaces connecting the side surfaces to each other; internal electrodes disposed in a length direction of the device body in the device body; external electrodes having a front surface portion covering the side surfaces and a band portion extended from the front surface portion and covering portions of the circumferential surfaces; and crack guide patterns disposed in the device body and guiding a progress direction of a crack generated from the circumferential surfaces so that the crack is directed toward the side surface, wherein the crack guide pattern includes: a first metal pattern; and a second metal pattern disposed to be closer to the circumferential surface as compared with the first metal pattern and having gaps.

17 Claims, 2 Drawing Sheets

(56) References Cited

FOREIGN PATENT DOCUMENTS

| JP | 2005-252104 | 9/2005 |
| JP | 2011151224 A * | 8/2011 |
| KR | 10-2006-0047733 | 5/2006 |
| WO | WO 2010/004550 | 4/2010 |

* cited by examiner

[Tg=Tg1+Tg2+ ··· +Tgn-1+Tgn(n indicates any integer)]

MULTILAYER CERAMIC DEVICE INCLUDING CRACK GUIDE PATTERNS HAVING DIFFERENT STRUCTURES

CROSS REFERENCE(S) TO RELATED APPLICATIONS

This application claims the foreign priority benefit under 35 U.S.C. Section 119 of Korean Patent Application Serial No. 10-2013-0017016, entitled "Multilayer Ceramic Device" filed on Feb. 18, 2013, which is hereby incorporated by reference in its entirety into this application.

BACKGROUND OF THE INVENTION

1. Technical Field

The present invention relates to a multilayer ceramic device, and more particularly, to a multilayer ceramic device capable of preventing deterioration of a function thereof due to generation of a crack.

2. Description of the Related Art

A chip component such as a general thin film type multilayer ceramic capacitor (MLCC) is configured to include a device body, internal electrodes, external electrodes, and the like. The device body has a structure in which a plurality of dielectric sheets called green sheets are multilayered, and the internal electrodes are provided to the dielectric sheets, respectively. In addition, the external electrodes have a structure in which they cover both end portions of an outer portion of the device body while being electrically connected to the internal electrodes.

Generally, since the multilayer ceramic device is designed to be focused on improving characteristics thereof, it is relatively vulnerable to external physical pressure or impact, thermal impact, other vibrations, or the like. Therefore, when the physical or thermal impact is applied to the multilayer ceramic device, a crack is generated in the device body. The crack is mainly generated in a surface of the device body adjacent to a distal end portion of the external electrode and then progresses to an inner portion of the device body. When the crack progresses to an active region of the device body, the multilayer ceramic device has a difficulty in performing its function.

In order to prevent damage to the chip component due to the crack, a technology of allowing the external electrode to have a structure capable of absorbing external impact has been suggested. To this end, the external electrode may have a structure in which it includes an internal metal layer directly covering the device body, an external metal layer exposed to the outside, and an intermediate layer interposed between the internal metal layer and the external metal layer. However, since the intermediate layer is made of a mixture material of a metal and a polymer resin, the polymer resin is thermally decomposed in a reflow or wave soldering process for mounting the chip component, such that the internal metal layer and the intermediate layer are separated from each other, thereby generating an internal void. The void and delamination phenomenon as described above, which is a problem of the chip component itself rather than a problem due to driving of an electronic apparatus in which the chip component is mounted, deteriorates a function of the chip component.

As another method, there is a method of providing a reinforcing pattern in the device body adjacent to a point at which the crack is frequently generated to block progress of the crack. However, since the number of multilayered patterns should be increased in the device body in order to apply the reinforcing pattern as described above, a cost required for manufacturing the device is increased and a thickness of a dielectric is relatively decreased, such that it is difficult to implement a high capacitance.

RELATED ART DOCUMENT

Patent Document (Patent Document 1) Korean Patent Laid-Open Publication No. 10-2006-0047733

SUMMARY OF THE INVENTION

An object of the present invention is to provide a multilayer ceramic device capable of maintaining a function thereof even at the time of generation of a crack due to external impact.

According to an exemplary embodiment of the present invention, there is provided a multilayer ceramic device including: a device body having side surfaces spaced apart from each other and circumferential surfaces connecting the side surfaces to each other; internal electrodes disposed in a length direction of the device body in the device body; external electrodes having a front surface portion covering the side surfaces and a band portion extended from the front surface portion and covering portions of the circumferential surfaces; and crack guide patterns disposed in the device body and guiding a progress direction of a crack generated from the circumferential surfaces so that the crack is directed toward the side surface, wherein the crack guide pattern includes: a first metal pattern; and a second metal pattern disposed to be closer to the circumferential surface as compared with the first metal pattern and having gaps.

A plurality of gaps may be disposed in a length direction of the second metal pattern so as to be spaced apart from each other.

A plurality of gaps may be disposed in a length direction of the second metal pattern so as to be spaced apart from each other, and a ratio of a total length of the gaps disposed in the length direction to a total length of the second metal pattern may be larger than 0.02.

A plurality of gaps may be disposed in a length direction of the second metal pattern so as to be spaced apart from each other, and a ratio of a total length of the gaps disposed in the length direction to a total length of the second metal pattern may be smaller than 0.51.

A plurality of gaps may be disposed in a length direction of the second metal pattern so as to be spaced apart from each other, and a ratio of a total length of the gaps disposed in the length direction to a total length of the second metal pattern may be larger than 0.02 and smaller than 0.51.

The crack guide pattern may be extended from the side surface toward an inner portion of the device body, and an extension length of the crack guide pattern may be equal to or longer than that of the band portion.

The device body may include: an active region having the internal electrode disposed therein; an inactive region corresponding to a region other than the active region, and the crack guide pattern may be disposed in the inactive region.

According to another exemplary embodiment of the present invention, there is provided a multilayer ceramic device including: a device body having an active region and an inactive region; internal electrodes disposed in the active region; external electrodes electrically connected to the internal electrodes while covering both end portions of the device body; and crack guide patterns disposed in the inactive region and guiding a crack generated in the inactive region so as to stay in the inactive region, wherein the crack guide pattern includes: a first metal pattern; and a second metal pattern disposed to be closer to a circumferential surface as compared with the first metal pattern and having gaps.

A plurality of gaps may be disposed in a length direction of the second metal pattern so as to be spaced apart from each other.

A plurality of gaps may be disposed in a length direction of the second metal pattern so as to be spaced apart from each other, and a ratio of a total length of the gaps disposed in the length direction to a total length of the second metal pattern may be larger than 0.02.

A plurality of gaps may be disposed in a length direction of the second metal pattern so as to be spaced apart from each other, and a ratio of a total length of the gaps disposed in the length direction to a total length of the second metal pattern may be smaller than 0.51.

A plurality of gaps may be disposed in a length direction of the second metal pattern so as to be spaced apart from each other, and a ratio of a total length of the gaps disposed in the length direction to a total length of the second metal pattern may be larger than 0.02 and smaller than 0.51.

DESCRIPTION OF THE PREFERRED EMBODIMENTS

Figure 1:
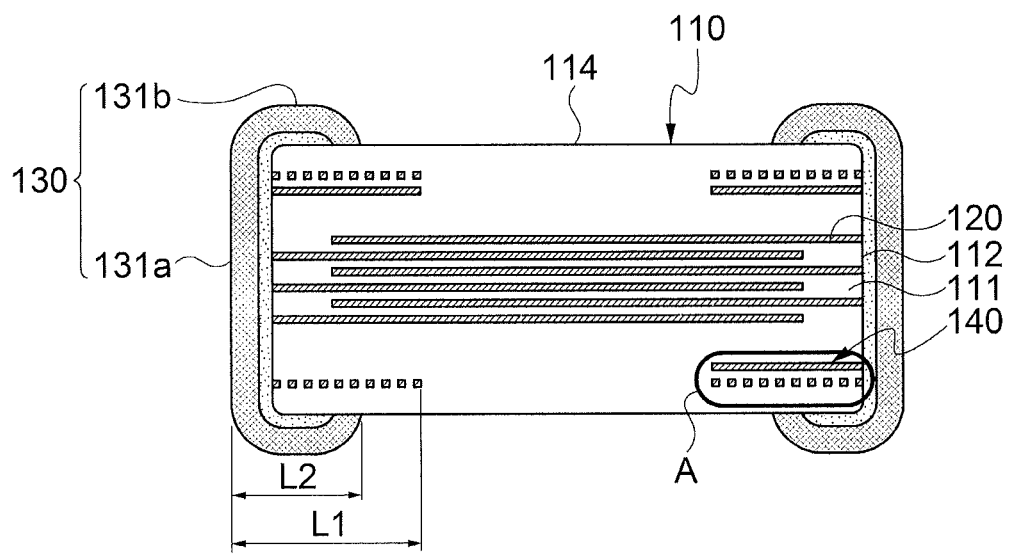
FIG. 1 is a view showing a multilayer ceramic device according to an exemplary embodiment of the present invention.

Various advantages and features of the present invention and methods accomplishing thereof will become apparent from the following description of exemplary embodiments with reference to the accompanying drawings. However, the present invention may be modified in many different forms and it should not be limited to the exemplary embodiments set forth herein. Rather, these exemplary embodiments may be provided so that this disclosure will be thorough and complete, and will fully convey the scope of the invention to those skilled in the art. Like reference numerals throughout the specification denote like elements.

Terms used in the present specification are for explaining the exemplary embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

Further, the exemplary embodiments described in the specification will be described with reference to cross-sectional views and/or plan views that are ideal exemplification figures. In the drawings, the thickness of layers and regions is exaggerated for efficient description of technical contents. Therefore, exemplified forms may be changed by manufacturing technologies and/or tolerance. Therefore, the exemplary embodiments of the present invention are not limited to specific forms but may include the change in forms generated according to the manufacturing processes. For example, an etching region vertically shown may be rounded or may have a predetermined curvature.

Hereinafter, a multilayer ceramic device and a method of manufacturing the same according to exemplary embodiments of the present invention will be described in detail with reference to the accompanying drawings.

Figure 2:
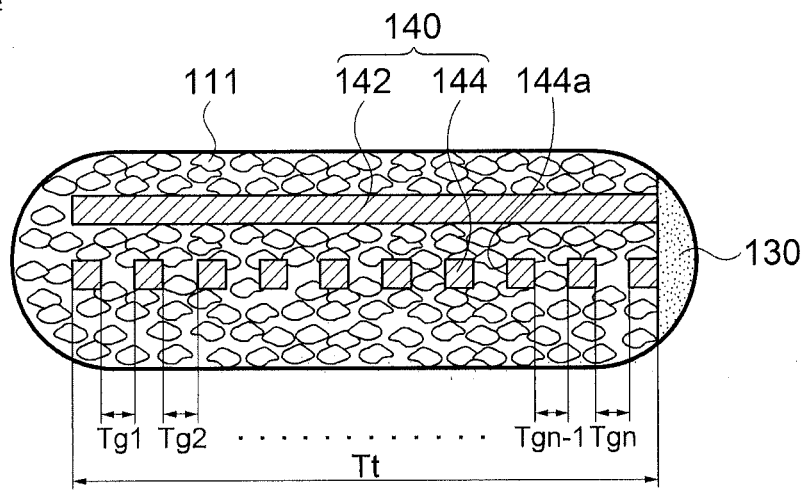
FIG. 2 is an enlarged view of the region A shown in FIG. 1.

FIG. 1 is a view showing a multilayer ceramic device according to an exemplary embodiment of the present invention; and FIG. 2 is an enlarged view of the region A shown in FIG. 1. In addition, FIG. 3 is a view showing a form guiding a progress direction of a crack of the multilayer ceramic device according to the exemplary embodiment of the present invention.

Figure 3:
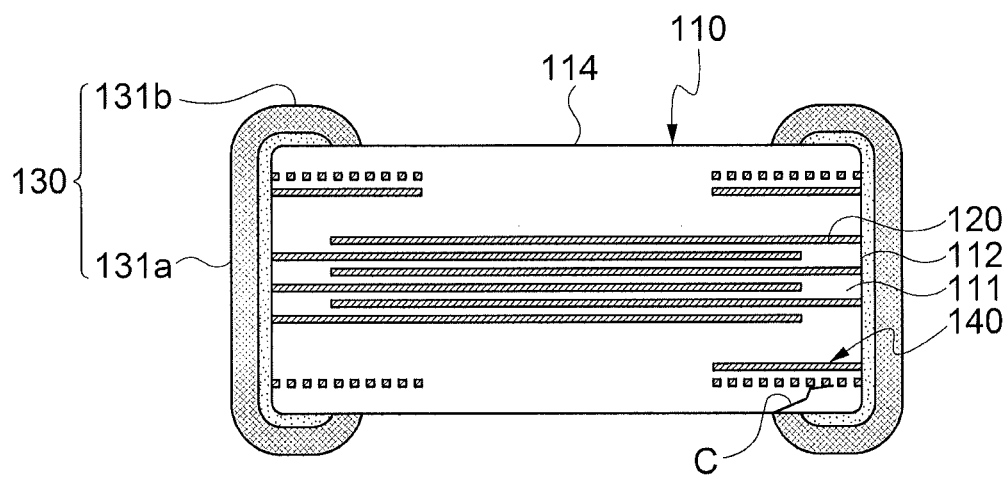
FIG. 3 is a view showing a form guiding a progress direction of a crack of the multilayer ceramic device according to the exemplary embodiment of the present invention.

Referring to FIGS. 1 to 3, the multilayer ceramic device 100 according to the exemplary embodiment of the present invention may be configured to include a device body 110, internal electrodes 120, external electrodes 130, and crack guide patterns 140.

The device body 110 may have a multi-layer structure in which a plurality of sheets are multilayered. Dielectric sheets 111 called green sheets may be used as the sheets, and a product formed by multi-layering the dielectric sheets may have substantially a hexahedral shape. Therefore, the device body 110 may have two side surfaces 112 spaced apart from each other and four circumferential surfaces 114 connecting the side surfaces to each other. The device body 110 may be divided into an active region and an inactive region. The active region may be generally positioned at the center of an inner portion of the device body 110 and may be a region in which the internal electrodes 120 are positioned. The inactive region, which is a region other than the active region, may be a region in which the internal electrodes 120 are not positioned.

The internal electrodes 120 may be disposed so as to be substantially in parallel with a length direction of the device body 110. The internal electrodes 120 may be circuit patterns formed on each of the sheets. The internal electrodes 120 may be metal patterns contacting the external electrodes 130. The internal electrodes 120 may be formed on each of the sheets and have a structure in which they are extended from the sides 112 to the inner portion of the device body 110. Optionally, the internal electrodes 120 may further include floating patterns. The floating pattern may be disposed between the side surfaces 112 without contacting the external electrodes 130.

The external electrodes 130 may cover both end portions of the device body 110. The external electrode 130 may include a front surface portion 131a and a band portion 131b, wherein the front surface portion 131a cover the side surface 112 and the band portion 131b may be extended from the front surface portion 131a and cover a portion of the circumferential surface 114. The band portion 131b may be a bonding portion for bonding the multilayer ceramic device 100 to an external apparatus (not shown) such as circuit board.

The crack guide pattern 140 may guide a progress direction of a crack C generated from the circumferential surface 114 so that the crack C is directed toward the side surface 112 in the inactive region of the device body 110. For example, in the case in which the multilayer ceramic device 100 is mounted in a predetermined electronic apparatus (not shown) to form a structure, when impact is applied to the structure, the crack C may be generated in the multilayer ceramic device 100 as shown in FIG. 3. The crack C as described above may be mainly generated at an end portion of the band portion 131b and a boundary portion of the circumferential surface and progress to the active region of the device body 110.

When the crack C progresses up to the active region of the device body 110, a defect may be generated in the multilayer ceramic device 100. Therefore, a progress of direction of the crack C is changed to prevent the crack C from progressing to the active region, thereby making it possible to maintain a function of the multilayer ceramic device 100. The crack guide pattern 140, which is to maintain the function of the multilayer ceramic device even though the crack C is generated as described above, may guide the progress direction of the crack C generated in the circumferential direction 114 to the side surface 112.

To this end, the crack guide pattern 140 may be disposed in the inactive region of the device body 110 to allow the crack C to be processed in the inactive region without progressing to the active region. As an example, the crack guide pattern 140 may include a first metal pattern 142 and a second metal pattern 144 disposed to be closer to the circumferential surface 114 as compared with the first metal pattern 142. The first and second metal patterns 142 and 144 may be disposed in the inactive region of the device body 110 so as to be substantially in parallel with each other. The first and second metal patterns 142 and 144 may be patterns made of various metals and include an oxide film (not shown) formed on a surface thereof.

It may be preferable that a length (hereinafter, referred to as a 'first length' L1) of the crack guide pattern 140 is equal to or longer than a length (hereinafter, referred to as a 'second length' L2) of the band portion 131b. Particularly, it may be preferable that a length of the second metal pattern 144 is equal to or longer than the second length L2. In the case in which the first length L1 is shorter than the second length L2, an area of the crack guide pattern 140 coping with the crack C is small, such that the crack C may avoid the crack guide pattern 140 to enter the active region of the device body 110.

In addition, the first and second metal patterns 142 and 144 may have different structures. As an example, the first metal pattern 142 may have a flat plate structure without broken sections. On the other hand, the second metal pattern 144 may have broken sections to allow gaps 144a to be formed. The number of gaps 144a may be plural. In this case, the gaps 144a may be disposed at predetermined intervals in a length direction of the second metal pattern 144. In the case in which each of the gap 144a has a line shape substantially perpendicular to the length direction of the second metal pattern 144, the second metal pattern 144 may be provided in a structure in which patterns having a plurality line shapes are disposed in parallel with each other. Alternatively, in the case in which each of the gaps 144a has an island shape, the second metal pattern 144 may be provided in a mesh structure in which a plurality of holes are locally or regularly formed.

The gaps 144a formed in the second metal pattern 144 may be to provide bonding force between the second metal pattern 144 and a BaTaO$_3$ layer, which is a material of the dielectric sheets 111. A ratio (hereinafter, referred to as a 'gap ratio') of the gaps 144a formed in the second metal pattern 144 may be calculated as a value, that is, Tg/Tt, obtained by dividing a total length Tg of the gaps corresponding to the sum of lengths (Tg1, Tg2, . . . Tgn) of each of the gaps 144a by a total length Tt of the second metal pattern 144. In the case in which the gap ratio (Tg/Tt) is excessively small, since the bonding force becomes excessively large, a function of the crack guide pattern 140 may be lost. That is, although the crack C progresses in a surface direction of the crack guide pattern 140 by separation between the crack guide pattern 140 and the BaTaO$_3$ layer, it may be difficult to accomplish this effect in the case in which the bonding force is excessively large. On the other hand, in the case in which the gap ratio Tg/Td is excessively large, the bonding force as described above is excessively weak, such that a delamination phenomenon that the second metal pattern 144 and the BaTaO$_3$ layer are separated from each other may be generated in a process of manufacturing the multilayer ceramic device 100.

Meanwhile, although the case in which the second metal pattern 144 has a structure different from that of the first metal pattern 142, that is, the gaps 144a are formed only in the second metal pattern 144, has been described by way of example in the present embodiment, gaps such as the above-mentioned gaps 144a may also be formed in the first metal pattern. In this case, the first and second metal patterns 142 and 144 may have a structure that is the same as or similar to each other. Alternatively, in the case in which shapes, dispositions, or the like, of the gaps formed in each of the first and second metal patterns 142 and 144 are different, the first and second metal patterns 142 and 144 may also have different structures.

In addition, although the case in which each of the gaps 144a has the line shape substantially perpendicular to the length direction of the second metal pattern 144 and the gap ratio Tg/Tt is the total length of the gaps 144a disposed along the second metal pattern 144 has been described by way of example in the present embodiment, since the gap ratio Tg/Tt means an area occupied by the gaps 144a in a total area of the second metal pattern 144, the ratio of the gaps 144a in the second metal pattern 144 may be calculated by various methods.

Further, although the case in which the crack C is processed in a form in which it is guided toward the side surface 112 along the second metal pattern 144 has been shown in FIG. 3, the crack C may also be processed in a form in which it passes through the gap 144a of the second metal pattern 144 and is then guided toward the side surface 112 along the first metal pattern 142.

As described above, the multilayer ceramic device 100 according to the exemplary embodiment of the present invention may include the device body 110 having the internal electrodes 120 formed therein, the external electrodes 130 covering both end portions of the device body 110, and the crack guide pattern 140 guiding a progress direction of the crack generated from the circumferential surface 114 in the device body 110 so that the crack C is directed toward the side surface 112 in the inactive region. In this case, even though the crack is generated in the device body 110, the progress direction of the crack may be changed into a region other than the active region in the device body, such that a function of the multilayer ceramic device 110 may be maintained. Therefore, in the multilayer ceramic device and the method of manufacturing the same according to the exemplary embodiment of the present invention, the crack guide pattern guiding the progress direction of the crack generated in the device body so that the crack does not progress to the active region is provided, thereby making it possible to prevent deterioration of the function of the multilayer ceramic device due to the generation of the crack.

EXAMPLE

Five hundred multilayer ceramic devices having a size of 1.6 mm×0.8 mm×0.8 mm and a capacitance of 1 nF were manufactured. In this case, two nickel metal patterns were formed as a crack guide pattern on a single dielectric sheet forming a sheet multilayered body of a device body in a process of manufacturing the device body. In this case, the nickel metal pattern disposed at an inner side of the device body was manufactured in a flat plate shape without being broken, and the nickel metal pattern disposed at an outer side of the device body was manufactured so as to have gaps having a gap ratio (Tg/Tt) as shown in Table 1.

TABLE 1

| No | Gap ratio (Tg/Tt) | Warpage strength | Delmination |
|---|---|---|---|
| 1 | 0.01 | 5/50 | 0/500 |
| 2 | 0.02 | 17/50 | 0/500 |
| 3 | 0.03 | 50/50 | 0/500 |
| 4 | 0.05 | 50/50 | 0/500 |
| 5 | 0.10 | 50/50 | 0/500 |
| 6 | 0.20 | 50/50 | 0/500 |
| 7 | 0.35 | 50/50 | 0/500 |
| 8 | 0.40 | 50/50 | 0/500 |
| 9 | 0.45 | 50/50 | 0/500 |
| 10 | 0.50 | 50/50 | 0/500 |
| 11 | 0.51 | 50/50 | 6/500 |
| 12 | 0.53 | 50/50 | 12/500 |
| 13 | 0.58 | 50/50 | 22/500 |

In the case of a warpage strength evaluation, after warpage up to 5 mm is applied in a speed of 1 mm sec to fifty samples for each condition, the number of samples in which a final crack path is guided along the crack guide pattern was confirmed by an internal destructive polishing analysis (DPA).

In the case of a delamination evaluation, after hundred samples are dipped for five seconds in a solder bath maintained at a temperature of about 290° C. for each condition, a DPA was performed to confirm delamination.

The warpage strength and delamination evaluations of samples classified depending on a thickness of the oxide film described above were shown in Table 1.

As shown in the above Table 1, in the case in which the gap ratio is larger than 0.02, at the time of performing the DPA after the warpage strength evaluation, it was confirmed that all of the cracks generated in the circumferential surface of the device body are guided along the crack guide pattern or stay in the crack guide pattern. On the other hand, in the case in which the gap ratio Tg/Tt is 0.02 or less, the crack was not guided by the crack guide pattern, but progressed up to an active region in samples. As a result, the number of samples in which the crack is guided along the crack guide pattern was decreased. Therefore, it was confirmed that in the case in which gaps are provided in the outermost metal pattern among the crack guide patterns and a gap ratio of the crack guide pattern is larger than 0.02, even though the crack is generated in the circumferential surface of the device body, a progress direction of the crack is guided by the crack guide pattern, such that the crack is induced to the side surface of the device body, thereby maintaining a function of the multilayer ceramic device.

Meanwhile, it was confirmed that in the case in which the gap ratio Tg/Tt is 0.51 or more, although a function of the crack guide pattern is maintained, a phenomenon that a dielectric layer is separated from the crack guide pattern is generated. The reason is that bonding force between the outermost metal pattern and the dielectric sheets is excessively weak, such that the outermost metal pattern and the dielectric layer are separated from each other. In this case, although characteristics of the device are not deteriorated due to the crack, since a defect of the device is generated in a manufacturing step, it is preferable that the gap ratio Tg/Tt is smaller than 0.51. Therefore, when considering a manufacturing defect, it may be preferable that the gap ratio Tg/Tt is larger than 0.02 and is less than 0.51.

With the multilayer ceramic device according to the exemplary embodiment of the present invention, the crack guide pattern guiding the progress direction of the crack generated in the device body so that the crack does not progress to the active region is provided, thereby making it possible to prevent deterioration of the function of the multilayer ceramic device due to the generation of the crack.

With the method of manufacturing a multilayer ceramic device according to the exemplary embodiment of the present invention, it is possible to manufacture the multilayer ceramic device having a structure capable of preventing deterioration of a function due to generation of the crack by allowing the crack not to progress to the active region of the device body even though the crack is generated in the device body.

The present invention has been described in connection with what is presently considered to be practical exemplary embodiments. In addition, the above-mentioned description discloses only the exemplary embodiments of the present invention. Therefore, it is to be appreciated that modifications and alterations may be made by those skilled in the art without departing from the scope of the present invention disclosed in the present specification and an equivalent thereof. The exemplary embodiments described above have been provided to explain the best state in carrying out the present invention. Therefore, they may be carried out in other states known to the field to which the present invention pertains in using other inventions such as the present invention and also be modified in various forms required in specific application fields and usages of the invention. Therefore, it is to be understood that the invention is not limited to the disclosed embodiments. It is to be understood that other embodiments are also included within the spirit and scope of the appended claims.

What is claimed is:

1. A multilayer ceramic device comprising:
    a device body having side surfaces spaced apart from each other and circumferential surfaces connecting the side surfaces to each other;
    internal electrodes disposed in a length direction of the device body in the device body;
    external electrodes having a front surface portion covering the side surfaces and a band portion extended from the front surface portion and covering portions of the circumferential surfaces; and
    crack guide patterns disposed in the device body,
    wherein the crack guide pattern includes:
    a first metal pattern; and
    a second metal pattern disposed to be closer to the circumferential surface as compared with the first metal pattern and having a plurality of gaps, and
    wherein the first metal pattern and the second metal pattern have different structures.

2. The multilayer ceramic device according to claim 1, wherein the plurality of gaps are disposed in a length direction of the second metal pattern so as to be spaced apart from each other.

3. The multilayer ceramic device according to claim 1, wherein the plurality of gaps are disposed in a length direction of the second metal pattern so as to be spaced apart from each other, and a ratio of a total length of the gaps disposed in the length direction to a total length of the second metal pattern is larger than 0.02.

4. The multilayer ceramic device according to claim 1, wherein the plurality of gaps are disposed in a length direction of the second metal pattern so as to be spaced apart from each other, and a ratio of a total length of the gaps disposed in the length direction to a total length of the second metal pattern is smaller than 0.51.

5. The multilayer ceramic device according to claim 1, wherein the plurality of gaps are disposed in a length direction of the second metal pattern so as to be spaced apart from each other, and a ratio of a total length of the gaps disposed in the length direction to a total length of the second metal pattern is larger than 0.02 and smaller than 0.51.

6. The multilayer ceramic device according to claim 1, wherein the crack guide pattern is extended from the side surface toward an inner portion of the device body, and an extension length of the crack guide pattern is equal to or longer than that of the band portion.

7. The multilayer ceramic device according to claim 1, wherein the device body includes:
an active region having the internal electrode disposed therein; and
an inactive region corresponding to a region other than the active region,
wherein the crack guide pattern is disposed in the inactive region.

8. The multilayer ceramic device according to claim 1, wherein the first metal pattern has gaps.

9. The multilayer ceramic device according to claim 1, wherein the plurality of gaps are disposed in a length direction in which the internal electrodes are alternately connected to the external electrodes so as to be spaced apart from each other.

10. The multilayer ceramic device according to claim 1, wherein the first metal pattern does not have gaps.

11. A multilayer ceramic device comprising:
a device body having an active region and an inactive region;
internal electrodes disposed in the active region;
external electrodes electrically connected to the internal electrodes while covering both end portions of the device body; and
crack guide patterns disposed in the inactive region,
wherein the crack guide pattern includes:
a first metal pattern; and
a second metal pattern disposed to be closer to a circumferential surface as compared with the first metal pattern and having a plurality of gaps, and
wherein the first metal pattern and the second metal pattern have different structures.

12. The multilayer ceramic device according to claim 11, wherein the plurality of gaps are disposed in a length direction of the second metal pattern so as to be spaced apart from each other.

13. The multilayer ceramic device according to claim 11, wherein the plurality of gaps are disposed in a length direction of the second metal pattern so as to be spaced apart from each other, and a ratio of a total length of the gaps disposed in the length direction to a total length of the second metal pattern is larger than 0.02.

14. The multilayer ceramic device according to claim 11, wherein the plurality of gaps are disposed in a length direction of the second metal pattern so as to be spaced apart from each other, and a ratio of a total length of the gaps disposed in the length direction to a total length of the second metal pattern is smaller than 0.51.

15. The multilayer ceramic device according to claim 11, wherein the plurality of gaps are disposed in a length direction of the second metal pattern so as to be spaced apart from each other, and a ratio of a total length of the gaps disposed in the length direction to a total length of the second metal pattern is larger than 0.02 and smaller than 0.51.

16. The multilayer ceramic device according to claim 11, wherein the plurality of gaps are disposed in a length direction in which the internal electrodes are alternately connected to the external electrodes so as to be spaced apart from each other.

17. The multilayer ceramic device according to claim 11, wherein the first metal pattern does not have gaps.

\* \* \* \* \*